United States Patent
Shand et al.

(10) Patent No.: US 9,042,239 B2
(45) Date of Patent: *May 26, 2015

(54) PORTABLE DIAGNOSTIC DEVICE FOR TROUBLE-SHOOTING A WIRELESS NETWORK AND A METHOD FOR TROUBLE-SHOOTING A WIRELESS NETWORK

(75) Inventors: Arthur Shand, Big Canoe, GA (US); Patrick Hendricks, Douglasville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 799 days.

This patent is subject to a terminal disclaimer.

(21) Appl. No.: 12/575,546

(22) Filed: Oct. 8, 2009

(65) Prior Publication Data

US 2010/0027439 A1    Feb. 4, 2010

Related U.S. Application Data

(63) Continuation of application No. 11/049,431, filed on Feb. 2, 2005, now Pat. No. 7,603,479.

(51) Int. Cl.
*H04L 12/26* (2006.01)
*H04W 24/08* (2009.01)
*H04W 24/00* (2009.01)

(52) U.S. Cl.
CPC .............. *H04W 24/08* (2013.01); *H04W 24/00* (2013.01)

(58) Field of Classification Search
CPC ........... H04L 12/26; H04L 9/32; H04L 12/56; H04L 29/06; H04L 12/28
USPC .......... 370/252, 245, 232, 248–249, 250, 254, 370/352; 714/31, 46, 48; 345/107, 296, 345/419, 428
See application file for complete search history.

(56) References Cited

U.S. PATENT DOCUMENTS

| | | |
|---|---|---|
| 3,600,525 A | 8/1971 | Garrett et al. |
| 3,792,205 A | 2/1974 | O'Dea |

(Continued)

OTHER PUBLICATIONS

Product information for T-BERD 310 Communications Analyzer, pp. 1-3, available on Dec. 19, 1999 at http://www.ttc.com/products/html/p_list/tb310gen.html.

(Continued)

*Primary Examiner* — Michael T Vu
(74) *Attorney, Agent, or Firm* — Hartman & Citrin LLC

(57) ABSTRACT

A portable diagnostic device (PDD) for diagnosing packet-based wireless networks. the PDD comprises an input device configured to convert user input into electrical signals, a radio frequency (RF) transceiver, an antenna, processing logic, a modem, and a display device. The processing logic is configured to execute a diagnostic software module that generates diagnostic commands for diagnosing a packet-based network and that interprets diagnostic information sent from the packet-based network to the PDD. The modem enables the PDD to wirelessly communicate via the RF transceiver and the antenna with a base transceiver station (BTS) that is in communication with the packet-based network. The display device displays diagnostic information received by the RF transceiver and processed by the processing logic. The diagnostic information displayed on the display device describes one or more attributes of the packet-based network.

11 Claims, 5 Drawing Sheets

(56) References Cited

U.S. PATENT DOCUMENTS

| | | | |
|---|---|---|---|
| 4,295,179 A | 10/1981 | Read | |
| 4,520,234 A | 5/1985 | Fields et al. | |
| 4,573,151 A | 2/1986 | Jotwani | |
| 4,620,765 A | 11/1986 | Knickerbocker | |
| 4,646,298 A | 2/1987 | Laws et al. | |
| 4,777,645 A | 10/1988 | Faith et al. | |
| 4,833,708 A | 5/1989 | Goodrich | |
| 4,849,963 A | 7/1989 | Kawano et al. | |
| 4,849,972 A | 7/1989 | Hackett et al. | |
| 4,879,716 A | 11/1989 | McNally et al. | |
| 4,922,516 A | 5/1990 | Butler et al. | |
| 4,998,240 A | 3/1991 | Williams | |
| 5,025,466 A | 6/1991 | Hilligoss et al. | |
| 5,075,926 A | 12/1991 | Jeong | |
| 5,189,663 A | 2/1993 | Williams | |
| 5,193,107 A | 3/1993 | Parker et al. | |
| 5,195,085 A | 3/1993 | Bertsch et al. | |
| 5,351,508 A | 10/1994 | Kelley | |
| 5,457,441 A | 10/1995 | Clement | |
| 5,636,344 A | 6/1997 | Lewis | |
| 5,784,564 A | 7/1998 | Camaisa et al. | |
| 5,850,386 A | 12/1998 | Anderson et al. | |
| 5,850,388 A | 12/1998 | Anderson et al. | |
| 5,917,905 A | 6/1999 | Whipple et al. | |
| 5,937,034 A | 8/1999 | Kennedy et al. | |
| 5,964,891 A * | 10/1999 | Caswell et al. | 714/31 |
| 5,978,940 A | 11/1999 | Newman et al. | |
| 6,002,671 A | 12/1999 | Kahkoska et al. | |
| 6,064,372 A | 5/2000 | Kahkoska | |
| 6,139,177 A | 10/2000 | Venkatraman et al. | |
| 6,160,871 A | 12/2000 | DeRee et al. | |
| 6,201,853 B1 | 3/2001 | Butler et al. | |
| 6,230,006 B1 | 5/2001 | Keenan et al. | |
| 6,249,516 B1 | 6/2001 | Brownrigg et al. | |
| 6,252,942 B1 | 6/2001 | Zoiss et al. | |
| 6,292,540 B1 | 9/2001 | Chea et al. | |
| 6,301,336 B1 | 10/2001 | Branton et al. | |
| 6,320,946 B1 | 11/2001 | Enzmann et al. | |
| 6,327,350 B1 | 12/2001 | Spangler et al. | |
| 6,351,521 B1 | 2/2002 | DuRee et al. | |
| 6,381,604 B1 | 4/2002 | Caughran et al. | |
| 6,385,300 B1 | 5/2002 | Mohammadian et al. | |
| 6,397,359 B1 | 5/2002 | Chandra et al. | |
| 6,417,672 B1 | 7/2002 | Chong | |
| 6,434,221 B1 | 8/2002 | Chong | |
| 6,453,259 B1 | 9/2002 | Infiesto | |
| 6,491,225 B1 | 12/2002 | Dvorkis et al. | |
| 6,539,384 B1 | 3/2003 | Zellner et al. | |
| 6,542,738 B2 | 4/2003 | Keenan et al. | |
| 6,574,310 B1 | 6/2003 | Hartman et al. | |
| 6,584,501 B1 | 6/2003 | Cartsonis et al. | |
| 6,611,498 B1 | 8/2003 | Baker et al. | |
| 6,741,675 B2 | 5/2004 | Chea et al. | |
| 6,751,253 B1 | 6/2004 | Walance et al. | |
| 6,799,147 B1 | 9/2004 | Balasubramanian et al. | |
| 6,819,655 B1 | 11/2004 | Gregson | |
| 6,857,013 B2 | 2/2005 | Ramberg et al. | |
| 6,891,803 B1 | 5/2005 | Chang et al. | |
| 7,092,947 B2 * | 8/2006 | Zellner et al. | 1/1 |
| 7,092,989 B2 | 8/2006 | Quesnel | |
| 7,193,605 B2 * | 3/2007 | Vincent et al. | 345/107 |
| 7,197,465 B1 | 3/2007 | Hu et al. | |
| 7,263,558 B1 | 8/2007 | Khirman et al. | |
| 7,406,709 B2 * | 7/2008 | Maher et al. | 726/12 |
| RE40,541 E | 10/2008 | Korhonen | |
| 7,596,096 B2 * | 9/2009 | Crawford et al. | 370/248 |
| 7,701,852 B1 * | 4/2010 | Hohn et al. | 370/232 |
| 8,145,447 B2 | 3/2012 | Zellner et al. | |
| 2001/0001616 A1 | 5/2001 | Rakib et al. | |
| 2001/0039824 A1 | 11/2001 | Sunshine et al. | |
| 2001/0040962 A1 | 11/2001 | Pratt et al. | |
| 2002/0036713 A1 | 3/2002 | Zhang et al. | |
| 2002/0064255 A1 | 5/2002 | Mohammadian et al. | |
| 2002/0124631 A1 | 9/2002 | Sunshine et al. | |
| 2002/0164954 A1 | 11/2002 | Jalali | |
| 2002/0178789 A1 | 12/2002 | Sunshine et al. | |
| 2003/0109260 A1 | 6/2003 | Fisher | |
| 2003/0174813 A1 | 9/2003 | Mohammadian et al. | |
| 2004/0069046 A1 | 4/2004 | Sunshine et al. | |
| 2004/0203467 A1 | 10/2004 | Liu et al. | |
| 2004/0208293 A1 | 10/2004 | Mohammadian et al. | |
| 2004/0236843 A1 | 11/2004 | Wing et al. | |
| 2004/0255192 A1 | 12/2004 | Watanabe et al. | |
| 2005/0061056 A1 | 3/2005 | Sunshine et al. | |
| 2005/0130645 A1 | 6/2005 | Dobson et al. | |
| 2005/0137838 A1 | 6/2005 | Medlyn | |
| 2005/0271029 A1 | 12/2005 | Iffland | |
| 2006/0009159 A1 * | 1/2006 | Leung | 455/67.11 |
| 2007/0206615 A1 * | 9/2007 | Plamondon et al. | 370/401 |
| 2007/0291907 A1 | 12/2007 | Corcoran | |
| 2008/0115215 A1 | 5/2008 | Bardsley | |
| 2009/0060495 A1 | 3/2009 | Wurst et al. | |
| 2009/0097408 A1 | 4/2009 | Corcoran | |
| 2009/0262903 A1 | 10/2009 | Govier et al. | |
| 2010/0279418 A1 | 11/2010 | Larson et al. | |

OTHER PUBLICATIONS

Description of MGTS diagnostic system, pp. 1-2, available on Dec. 17, 1999 at http://www.tekelec.com/products/mgts/mgts.pdf.

Product Highlights for MGTS diagnostic system, pp. 1-5, available on Dec. 17, 1999 at http://www.tekelec.com/products/mgts/default.asp.

Wireless Application Protocol Wireless Datagram Protocol Specification of May 14, 1999, pp. 1, 8-12, 15-32, 37, available on Dec. 17, 1999 at http://www.wapforum.org/what/technical/SPEC-WDP-19990514.pdf.

Application Note of Nov. 6, 1998, on "Using a Web browser to connect to the DominoServer," pp. 1-3, available on Dec. 17, 1999 at http://download.wg.com/appnotes/dominoserver_browser.pdf.

Wireless Application Protocol Architecture Specification of Apr. 30, 1998, pp. 1, 7-9, 11-19, available at http://www.wapforum.org/what/technicall/SPEC-WAPAArch-19980430.pdf.

Description of an NAMS Local Number Portability Application, p. 1, available on Dec. 19, 1999 at http://www.digilog.com/LNPAPP.HTM.

Description of an NAMS Frame Relay Application, pp. 1-4, available on Dec. 19, 1999 at http://www.digilog.com/FRAPP.HTM.

Description of an NAMS SS#7 Application, pp. 1-6, available on Dec. 19, 1999 at http://www.digilog.com/SS7APP.HTM.

Aceterna's FST-2000 TestPad, User Interface Module (UIM) Version 6. 2000.

Acterna Launches Wireless and Internet-Enable TestPad, http://www.ada.com/united_states/News_And_Events/News_Releases/PR02/053002_2.ht...Sep. 7, 2005.

Description of Harris Dracon TS22ALO Test Set, p. 1, available on Dec. 19, 1999 at http://www.wisecomponents.com/ets/showpage.cgi?template=_templates/ts22alo.html.

White Paper of Mar. 10, 1999, on "What is a Protocol Analyzer?," pp. 1-10, available on Dec. 19, 1999 at http://www.wwgsolutions.com/techlibrary/articles/protocol.html.

Tekelec, "Tekelec Enhances EAGLE and GTPS Product Lines," Press Release, Sep. 22, 1998, pp. 1-5.

Tekelec, "Tekelec announces MGTS Sentinel," Press Release, Feb. 8, 1999, pp. 1-2.

U.S. Office Action dated Jul. 12, 2002 in U.S. Appl. No. 09/586,066.

U.S. Notice of Allowance dated Nov. 4, 2002 in U.S. Appl. No. 09/586,066.

U.S. Office Action dated Apr. 7, 2003 in U.S. Appl. No. 10/334,874.

U.S. Office Action dated Jul. 25, 2003 in U.S. Appl. No. 10/334,874.

U.S. Office Action dated Jun. 18, 2004 in U.S. Appl. No. 10/334,874.

U.S. Office Action dated Mar. 7, 2005 in U.S. Appl. No. 10/334,874.

U.S. Office Action dated Nov. 28, 2005 in U.S. Appl. No. 10/334,874.

U.S. Notice of Allowance dated May 5, 2006 in U.S. Appl. No. 10/334,874.

U.S. Office Action dated Jun. 23, 2008 in U.S. Appl. No. 11/442,754.

U.S. Office Action dated Dec. 8, 2008 in U.S. Appl. No. 11/442,754.

U.S. Office Action dated Jul. 15, 2009 in U.S. Appl. No. 11/442,754.

U.S. Office Action dated Jan. 12, 2010 in U.S. Appl. No. 11/442,754.

U.S. Office Action dated Jul. 27, 2010 in U.S. Appl. No. 11/442,754.

(56) References Cited

OTHER PUBLICATIONS

U.S. Office Action dated Jan. 3, 2011 in U.S. Appl. No. 11/442,754.
U.S. Office Action dated Apr. 15, 2011 in U.S. Appl. No. 11/442,754.
U.S. Notice of Allowance dated Sep. 21, 2011 in U.S. Appl. No. 11/442,754.
U.S. Notice of Allowance dated Mar. 14, 2012 in U.S. Appl. No. 13/307,365.
U.S. Office Action dated Dec. 1, 2003 in U.S. Appl. No. 10/334,874.
U.S. Office Action dated Nov. 20, 2012 in U.S. Appl. No. 13/484,790.
U.S. Office Action dated May 9, 2013 in U.S. Appl. No. 13/484,790.
U.S. Office Action dated Aug. 23, 2013 in U.S. Appl. No. 13/484,790.
U.S. Office Action dated Feb. 24, 2014 in U.S. Appl. No. 13/484,790.
Bisdikian, Chatschik et al., "WiSAP: A Wireless Personal Access Network for Handheld Computing Devices," Dec. 1998, IEEE Personal Communications, pp. 18-25.
U.S. Office Action dated Jul. 5, 2006 in U.S. Appl. No. 11/049,431.
U.S. Office Action dated Dec. 14, 2006 in U.S. Appl. No. 11/049,431.
U.S. Office Action dated Jul. 18, 2007 in U.S. Appl. No. 11/049,431.
U.S. Office Action dated Nov. 28, 2007 in U.S. Appl. No. 11/049,431.
U.S. Office Action dated May 22, 2008 in U.S. Appl. No. 11/049,431.
U.S. Office Action dated Dec. 15, 2008 in U.S. Appl. No. 11/049,431.
U.S. Notice of Allowance dated Jun. 15, 2009 in U.S. Appl. No. 11/049,431.
U.S. Appl. No. 11/442754 Notice of Allowance mailed Nov. 2, 2011.
U.S. Appl. No. 13/484790 Office Action mailed Aug. 20, 2014.
Office Action mailed Apr. 3, 2015 in U.S. Appl. No. 13/484790.

\* cited by examiner

PORTABLE DIAGNOSTIC DEVICE FOR TROUBLE-SHOOTING A WIRELESS NETWORK AND A METHOD FOR TROUBLE-SHOOTING A WIRELESS NETWORK

This application is a continuation of U.S. patent application Ser. No. 11/049,431, filed Feb. 2, 2005, now U.S. Pat. No. 7,603,479, which is incorporated by reference herein in its entirety.

BACKGROUND OF INVENTION

1. Field of Invention

The present invention is directed to wireless communications, and more particularly, to a portable diagnostic device for trouble-shooting wireless packet-based networks.

2. Description of Related Art

Wireless telecommunications providers each utilize an extensive array of diagnostic tools and procedures to optimize the level of reliability experienced by their respective customers. A lineman's handset is one example of a tool regularly used to trouble-shoot a service problem being experienced by a customer. The lineman's handset is a portable device that may be used by a field technician to test a particular telephone line for compliance with performance standards relating to items such as dial tone reception, proper ringing signals and noise levels.

Wireless data protocols, such as the Wireless Application Protocol (WAP) and General Packet Radio Service (GPRS), for example, enable people to access Internet content via wireless devices. WAP is an application environment and a set of communications protocols for wireless devices that enables a user to wirelessly request and receive content from the Internet. The event of requesting and receiving content from the Internet via a WAP-enabled device is referred to as a WAP session. A typical WAP session is supported in part by resources of a typical circuit-switched cellular network and in part by resources of a data network.

A GPRS session is supported almost entirely by resources of a data network, with the exception of the cellular base station, which provides the communication link between the GPRS data network and the GPRS-enabled mobile station. GPRS networks can deliver content such as, for example, short message service (SMS), multi-media messaging service (MMS), email, games and WAP applications.

Although portable diagnostic handsets exist that can be utilized by a network engineer to trouble-shoot circuit-switched mobile communication networks, these devices are not capable of trouble-shooting packet-based data networks. Historically, protocol sniffers located at network communications operations centers (NOCs) have been used to trouble-shoot various communications problems in wireless packet-based data networks, including, for example, point-to-point protocol (PPP) negotiations. Protocol sniffers are unobtrusively inserted into the protocol flow at a NOC at a point between appropriate network elements such as servers, routers, etc., where protocol events can be trapped, or "sniffed", for subsequent display and analysis at the NOC. Protocol sniffers generally are designed for use in the wired environment of the NOC, not in the field where a wireless network subscriber's wireless terminal (e.g., telephone, personal computer (PC), personal digital assistant (PDA), etc.) connects to a host computer or the Internet via a radio frequency (RF) system.

A need exists for a portable diagnostic device that is capable of being used to diagnose packet-based data networks, such as, for example, GPRS and WAP networks, and which is adapted to be used in the field.

SUMMARY OF THE INVENTION

The present invention provides a portable diagnostic device (PDD) and method for diagnosing packet-based wireless networks. The PDD comprises an input device configured to convert user input into electrical signals, a radio frequency (RF) transceiver, an antenna, processing logic, a modem, and a display device. The processing logic is configured to execute a diagnostic software module that generates diagnostic commands for diagnosing a packet-based network and that interprets diagnostic information sent from the packet-based network to the PDD. The modem enables the PDD to wirelessly communicate via the RF transceiver and the antenna with a base transceiver station (BTS) that is in communication with the packet-based network. The display device displays diagnostic information received by the RF transceiver and processed by the processing logic. The diagnostic information displayed on the display device describes one or more attributes of the packet-based network.

The method includes processing user input corresponding to one or more commands to be performed by one or more components of a packet-based network, wirelessly communicating the commands from the PDD to the packet-based network, receiving one or more responses to said one or more commands in the PDD, processing the responses received in the PDD into displayable information, and displaying the displayable information on a display device of the PDD.

These and other features and advantages of the invention will become apparent from the following description, drawings and claims.

DETAILED DESCRIPTION OF THE INVENTION

Figure 1:
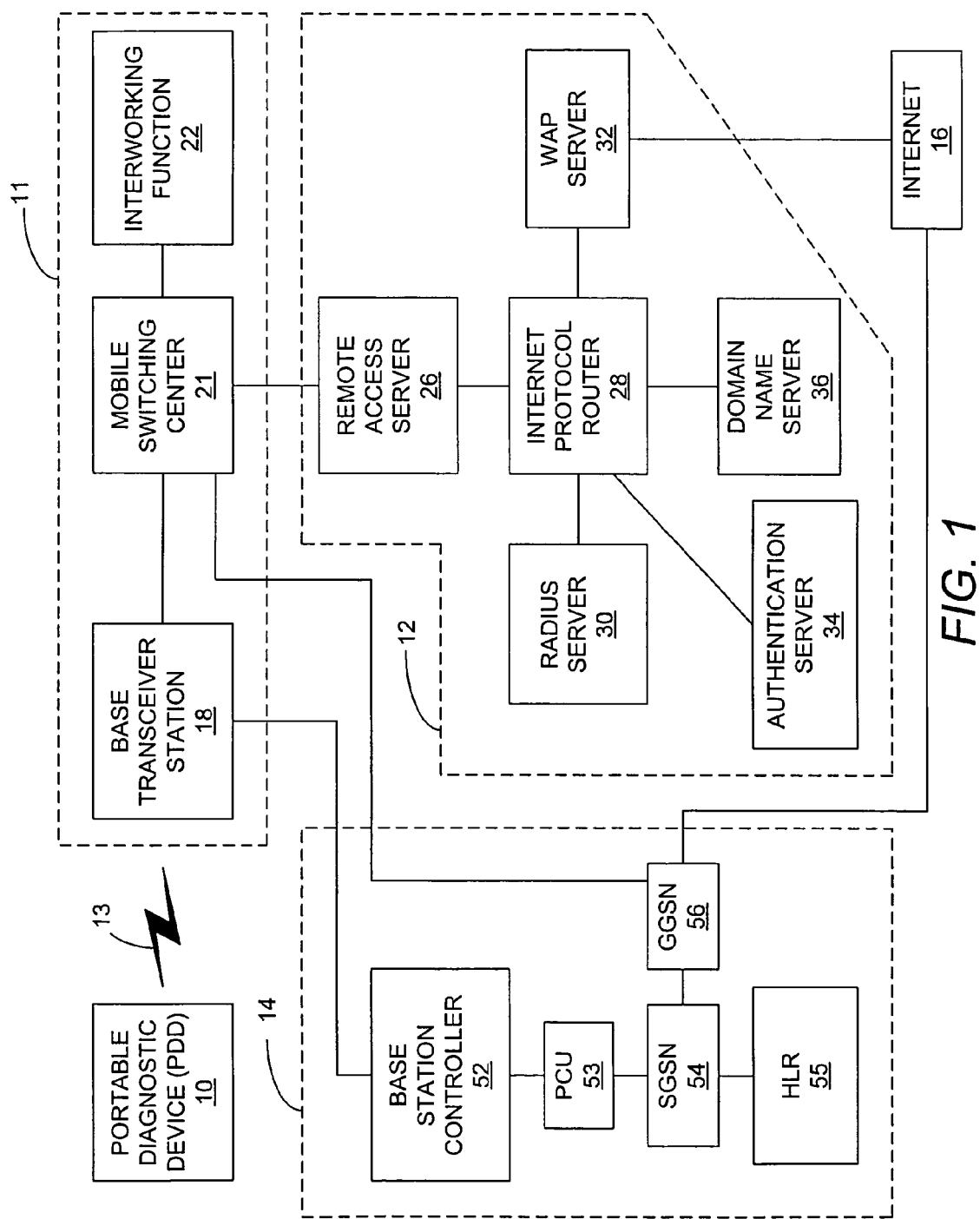
FIG. 1 illustrates a block diagram of a wireless network that includes a WAP network and a GPRS network, both of which can be used to access the Internet.

FIG. 1 is a block diagram of a wireless network that includes a mobile communications network 11, a WAP network 12 and a GPRS network 14. In accordance with an embodiment of the present invention, a portable diagnostic device (PDD) 10 is provided that is configured with intelligence for wirelessly diagnosing the GPRS network 14. The PDD 10 may also be configured with intelligence for wirelessly diagnosing the WAP network 12. Thus, the PDD 10 is particularly well suited for use in the field where a wireless network subscriber's wireless terminal connects to a host computer or to the Internet via a network operator's RF system. The PDD 10 preferably includes logic that enables it to diagnose network parameters and protocol flow and to display diagnostic results to the person using the PDD 10. The components and functionality of the PDD 10 are described below with reference to FIGS. 2 and 3.

Preferably, the PDD 10 is both GPRS-enabled and WAP-enabled, and thus is capable of accessing the Internet 16 via both the WAP network 12 and via the GPRS network 14. The PDD 10 of the present invention is at least GPRS-enabled so that it is capable of accessing the Internet 16 via the GPRS network 14. The PDD 10 communicates with the mobile communication network 11 via a wireless RF link 13 between the PDD 10 and a base transceiver station (BTS) 18 of the mobile communications network 11. The mobile communication network 11 also includes a mobile switching center (MSC) 21 and an interworking function (IWF) component 22. The BTS 18 typically includes, for example, a tower, antennas, cables, RF transceivers, power supplies, and controller systems (not shown).

The MSC 21 communicates with the BTS 18 and with the IWF component 22. The MSC 21 includes an automatic switching system (not shown) that coordinates the establishment of calls to and from the PDD 10 to and from the WAP network 12. The IWF component 22 communicates with the MSC 21 and may include a modem pool (not shown) for establishing a circuit-switched data (CSD) connection between the PDD 10 and the WAP network 12 via the MSC 21. The IWF component 22 is typically implemented as a packet control unit (PCU).

The WAP network 12 typically includes a remote access server (RAS) 26, an IP (Internet Protocol) router 28, a Remote Access Dial-In User Services (RADIUS) server 30, a WAP server 32, an authentication server 34, and a domain name server (DNS) 36. The remote access server 26 communicates with the MSC 21 and is configured to receive circuit-switched data calls that originate at the PDD 10. The remote access server 26 typically assigns a temporary IP address to the PDD 10 and generates a serial Transmission Control Protocol/Internet Protocol (TCP/IP) data stream associated with the circuit-switched data call.

The IP router 28 is a protocol-sensitive switching device used to direct IP traffic in and out of a number of other WAP network elements, such as the remote access server 26, the RADIUS server 30, the WAP server 32, the authentication server 34, and the domain name server 36. The RADIUS server 30 communicates with the remote access server 26 via the IP router 28, and typically includes a database populated with the IP address and identification information associated with the PDD 10.

The WAP server 32 communicates with the remote access server 26 and with the Internet 16 via the IP router 28. The WAP server 32 typically functions as the physical interface between the WAP network 12 and the Internet 16. The WAP server 32 retrieves Internet content and forwards the content to the PDD 10 via the IP router 28, the remote access server 26 and the mobile communications network 11. The WAP server 32 converts the Internet content into a format suitable for display on the PDD 10 prior to forwarding the content to the PDD 10. Thus, the WAP server 32 may be thought of as serving as a WAP gateway for the WAP network 12 of FIG. 1. The WAP server 32 may also be responsible for functions such as user provisioning, user database creation and maintenance, bi-directional security, traffic control, and call detail recording (CDR) generation.

The authentication server 34 communicates with the WAP server 32 via the IP router 28, and may include a subscriber database used to authenticate a user of the PDD 10 for purposes of conducting a WAP session.

The domain name server 36 communicates with the WAP server 32 via the IP router 28, and may include a database that stores tables of both domain names and IP addresses. When a domain name is entered at the PDD 10 in the form of a universal resource locator (URL), the textual representation of a web site address, the domain name server 36 typically translates the universal resource locator into an IP address associated with a web site, and forwards the IP address to the WAP server 32 via the IP router 28.

The WAP network 12 may also include a number of other network elements not shown in FIG. 1, such as, for example, short message service centers, e-mail servers, and firewalls. The present invention is not limited with respect to the components or configuration of the WAP network 12 shown in FIG. 1.

The manner in which the PDD 10 accesses the Internet 16 via the GPRS network 14 will now be described with reference to FIG. 1. When the GPRS-enabled PDD 10 initiates a data packet session, the BTS 18 communicates a request to set up a GPRS data packet session to the base station controller (BSC) 52 of the GPRS network 14. The BSC 52 has intelligence that enables it to detect that the request is for packet data as opposed to voice data, and vice versa. When the BSC 52 detects that the request is for packet data, the BSC 52 forwards the request to a packet control unit (PCU) 53, which converts the request from radio link protocol (RLP) format into uplink packets suitable for processing by the serving GPRS support node (SGSN) 54. The SGSN 54 converts the packets received from the PCU 53 into Internet Protocol (IP) packets. The gateway GPRS support node (GGSN) 56 obtains the Internet address associated with the user request from the domain name server 36 via the MSC 21, the remote access server 26 and the IP router 28. The GGSN 56 then performs the routing functions over the Internet 16 needed to set up the link between the PDD 10 and the Internet address identified in the request.

In the downlink direction, the GGSN 56 receives IP packets and forwards them to the SGSN 54, which converts the IP packets into downlink packets for processing by the PCU 53. The PCU 53 converts the downlink packets into RLP formatted data and forwards the RLP data to the BSC 52. The BSC 52 forwards the RLP data to the BTS 18 via the MSC 21. The BTS 18 wirelessly transmits the information to the PDD 10. The PDD 10 then displays the data on a display of the PDD 10.

Figure 2:
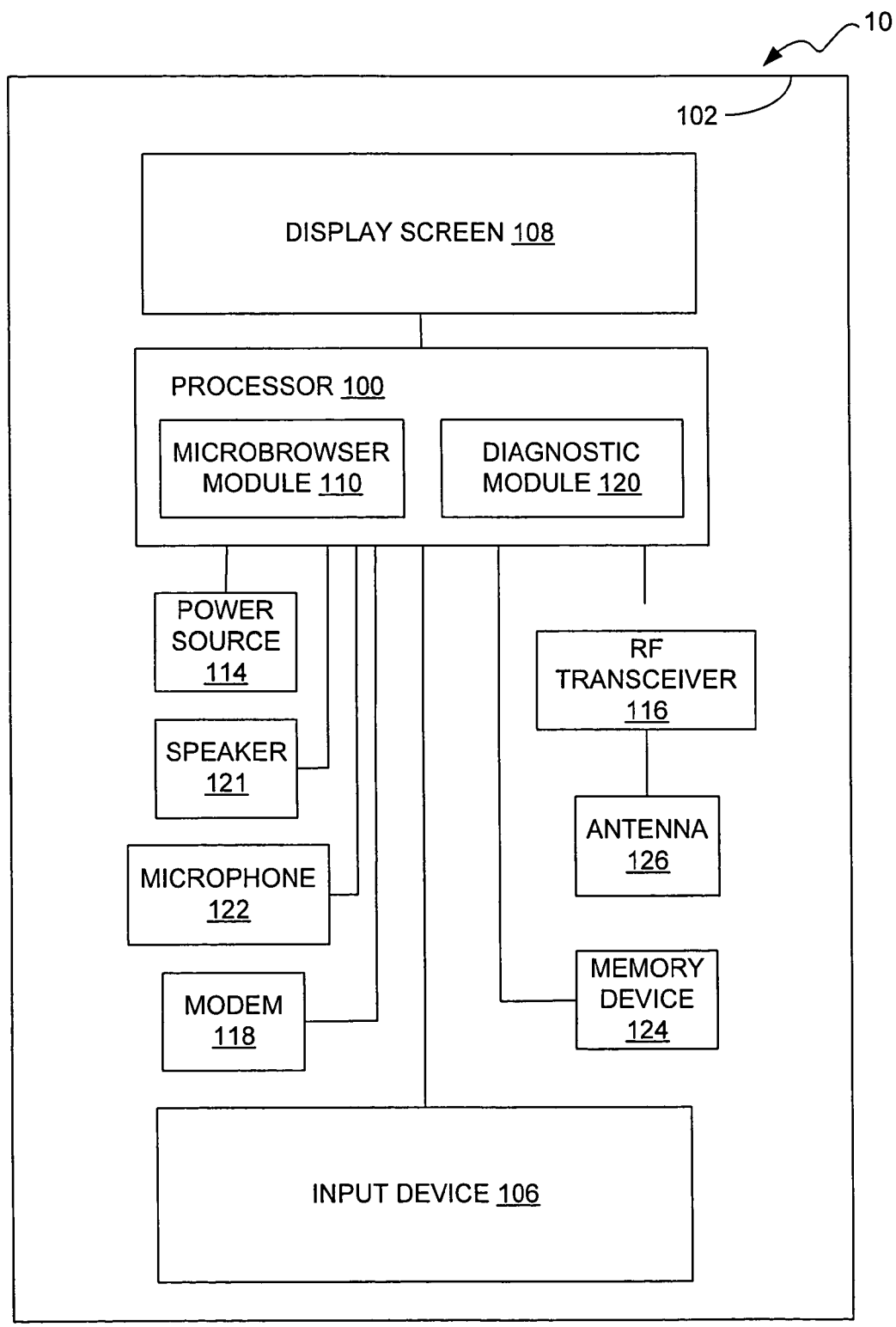
FIG. 2 illustrates a block diagram of the PDD of the present invention in accordance with an exemplary embodiment having logic configured to trouble-shoot a packet-based network, such as GPRS network, for example.

As stated above, the PDD 10 of the present invention is configured with intelligence that enables the PDD 10 to diagnose packet-based networks, such as the GPRS network 14, for example. FIG. 2 is a block diagram of the PDD 10 of the present invention in accordance with an exemplary embodiment. In accordance with this embodiment, the PDD 10 has logic configured to trouble-shoot a packet-based network, such as GPRS network 14, for example. The PDD 10 in accordance with this embodiment is a GPRS-enabled device having a housing 102, a processor 100, an input device 106, a display device 108, a power source 114, a speaker 121, a microphone 122, a modem 118, an RF transceiver 116, an antenna 126 and a memory device 124.

The processor 100 is programmed to control the operations of the PDD 10. The processor 100 may be any type of computational device including, for example, a microprocessor, a microcontroller, an application specific integrated circuit (ASIC), a digital signal processor (DSP), one or more printed circuit boards (PCBs), etc. The processor 100 is programmed to execute a microbrowser software module 110 and a diagnostic module 120. The microbrowser module 110 performs typical microbrowser functions to enable the PDD 10 to request and receive information over the Internet 16 via the GPRS network 14. The diagnostic module 120 analyzes the information obtained by the microbrowser module 110 and causes diagnostic IP-based information to be displayed on the display screen 108. The display screen 108 preferably is a relatively large high-resolution color display screen capable of displaying one entire page of relevant information at a time.

Currently, certain IP-based information is returned to mobile devices, including, for example, the IP address of the mobile device, the mobile subscriber ISDN (MSISDN), the identities of the BTS, BSC and MSC handling the session, etc. Although this information is typically returned to mobile devices, mobile devices currently are not configured to display this information. In accordance with the invention, the microbrowser module 110 and the diagnostic module 120 operate in conjunction with one another to enable the PDD 10 to request and display information that is helpful or necessary to enable a person to diagnose a packet-based network.

Figure 3:
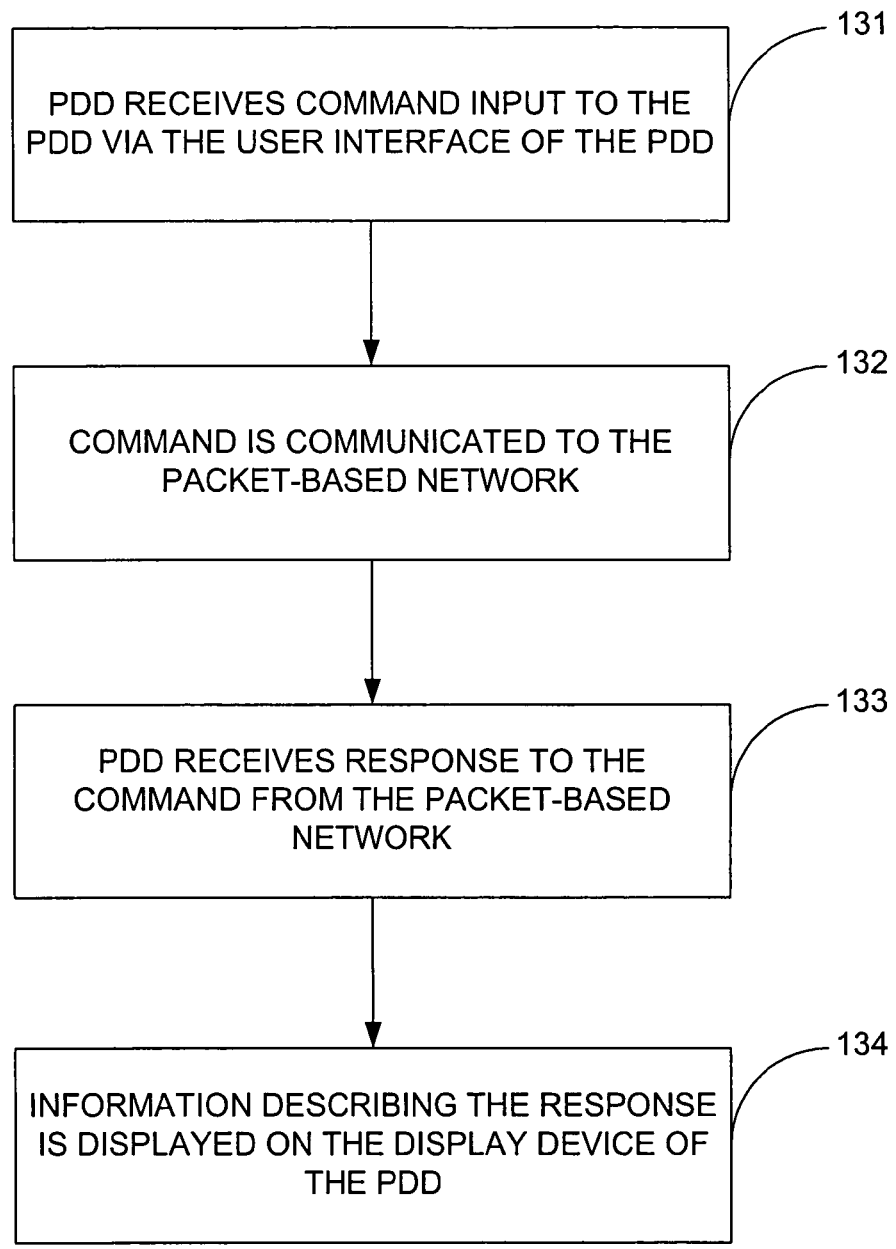
FIG. 3 illustrates a flow chart representing the method of the invention in accordance with the preferred embodiment for diagnosing a packet-based network using a PDD.

FIG. 3 illustrates a flow chart representing the method of the invention in accordance with the preferred embodiment for diagnosing a packet-based network using a PDD 10. A user enters a command on the PDD 10 relating to a task to be performed to diagnose a packet-based network or a component thereof, as indicated by block 131. The command is then communicated to the packet-based network in the manner described above with reference to FIG. 1, as indicated by block 132. When the task is performed in the packet-based network, a response to the command is returned to the PDD 10, as indicated by block 133. Information describing the response is then displayed on the display screen of the PDD 10, as indicated by block 134.

Figure 4:
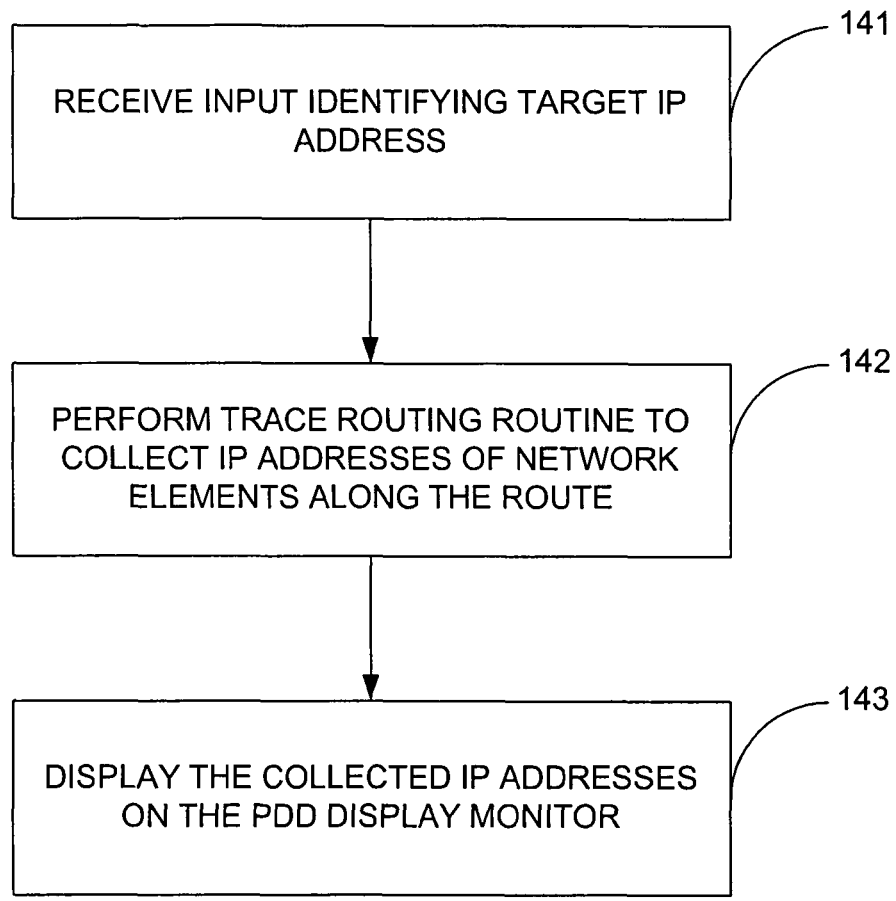
FIG. 4 illustrates a flowchart of the method of the invention in accordance with an exemplary embodiment for performing route tracing.

One useful trouble-shooting method provided by the invention is route tracing. FIG. 4 illustrates a flowchart of the method of the invention in accordance with an exemplary embodiment for performing route tracing. The microbrowser module 110 is configured to accept an IP address that has been input via input device 106 to the PDD 10. When the user wishes to target a particular element of the GPRS network 14, the user enters the IP address of the network element being targeted via the input device 106, which may be, for example, a keypad, a digitizer panel, etc. The processor 100 of the PDD 10 receives and processes this input, as indicated by block 141. The diagnostic module 120 performs a trace route routine that collects the IP addresses of the elements along the route to the target IP address, as indicated by block 142. The diagnostic module 120 then causes the collected IP addresses to be displayed on the display screen 108, as indicated by block 143.

In addition, the invention enables other types of packet-based network information to be obtained from a packet-based network such as GPRS network 14 and displayed on the display 108 of the PDD 10, including, but not limited to: (1) packet size information, (2) information relating to the type of data security employed (e.g., TLS, WEP, etc.), (3) information relating to the type of user authentication employed, e.g., Challenge Handshake Authentication Protocol (CHAP), Password Authentication Protocol (PAP), etc., and information relating to the IP multimedia subsystem (IMS) infrastructure. The PDD 10 preferably also supports real-time transport protocol (RTP) and control protocol (RTCP). The diagnostic module 120 is capable of analyzing RTP sessions in order to build call flows.

Figure 5:
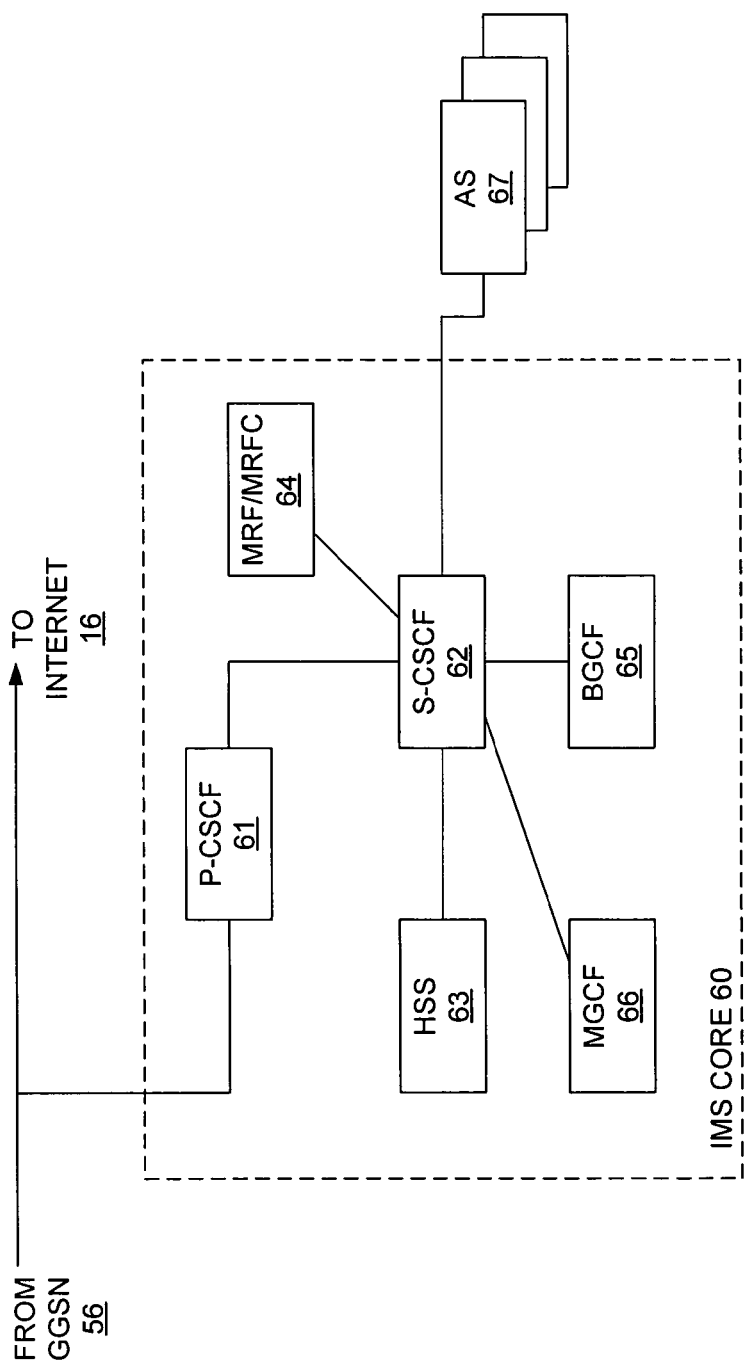
FIG. 5 illustrates a block diagram representing an IP multimedia subsystem (IMS) network core, which interfaces with the GGSN of the GPRS network shown in FIG. 1.

FIG. 5 illustrates a block diagram representing an IP multimedia subsystem (IMS) network core 60, which interfaces with the GGSN 56 of the GPRS network 14 shown in FIG. 1. An IMS network has an infrastructure that enables multiple services to be provided quickly. Preferably, the PDD 10 is IMS-enabled to allow the PDD 10 to perform diagnostic tests on the IMS network core 60. The IMS infrastructure resides off the Gi interface of the second generation/third generation (2G/3G) core network. The invention enables the IMS network core 60 to be tested and for information associated with the testing to be displayed on display screen 108 of PDD 10 to facilitate diagnosis. This capability assumes that a private session initiation protocol (SIP) extension for associated uniform resource identifiers (URI) will be set up that will register on the IMS network core 60 for various services being tested. This also assumes that a 2G/3G wireless user account for packet services has been provisioned for GPRS/Enhanced Data rates for GSM Evolution (EDGE) packet data service. Thus, the invention enables the user to build call flow and measure latencies in the IMS network core 60.

A typical IMS network core 60 includes a proxy call session control function (P-CSCF) component 61 that acts as a proxy for the user and routes SIP messages to the serving CSCF (S-CSCF) component 62. The home subscriber server (HSS) 63 functions as the data repository for all subscriber profile information, such as the type of services allowed for a subscriber, for example. The HSS 63 also interfaces with home location registers (HLRs) (not shown) for obtaining subscriber location and mobility information. The S-CSCF component 62 downloads subscriber profile information from the HSS 63 and is responsible for service control for the end user, routing of SIP messages, controlling service access, registering third party application servers 67, and other functions. The application servers 67 interface to the IMS network core 60 to provide various services for users, such as, for example, video conferencing, in which case the application server 67 handles the audio and video synchronization and distribution to all participants.

The media resource function (MRF) and MRF controller (MRFC) component 64 is a functional element that handles the user media (e.g., audio, video, etc.) and transcoding, distribution and multiplexing. The breakout gateway control function (BGCF) component 65 is the control element that interfaces the audio services provided by the IMS network core 60 with other networks. The BGCF component 65 is responsible for choosing the correct mobile MGCF component 66 or landline interface.

The invention also allows a user to execute various commands (typically in serial fashion for particular tests) in order to test the IMS core network 60 operation. In the upstream direction, the microbrowser module 110 and the diagnostic module 120 operate to allow SIP commands to be sent either by inputting them to the PDD 10 via input device 106 or displayed in drop down menu on display 108 for selection by the user. In the downstream direction, the microbrowser module 110 and the diagnostic module 120 operate to receive responses to SIP commands (e.g., Register, BYE, Publish, Subscribe, etc.) and to cause the responses to be displayed on the display 108. Preferably, the PDD 10 of the invention also supports signaling compression (SigComp), both static and dynamic, so that packet contents can be investigated. For example, SIP headers may be examined to determine routes in a manner similar to the manner in which layer 3 trace route functionality is performed. Timestamps are captured off of the headers in order to measure latency within the IMS network core 60. The diagnostic module 120 also examines the body content of SIP messages as well as session definition protocol (SDP) content and displays corresponding information on the display screen 108. In addition, the diagnostic module 120 preferably stores all SIP requests and responses in memory device 124 in order to enable a call flow to be built.

Typical IMS sessions begin with a REGISTER message sent from the PDD 10 to the IMS Core 60. The HSS 63 downloads the subscriber profile to the S-CSCF component 62. The S-CSCF component 62 then sends third party registrations to the application servers 67 as required by the initial filter criteria (IFC) contained in the profile.

Typical peer-to-peer sessions begin with an INVITE message (which includes initial Session Description Parameters) sent from the PDD 10 to the P-CSCF component 61, routed through the S-CSCF component 62, routed through an Interrogating Call Session Control Function (I-CSCF) component (not shown), then to the recipients S-CSCF component (not shown) and P-CSCF component (not shown). The recipient typically answers the INVITE with its capabilities in the Session Description Parameter that are appropriate for the required media involved in the session (e.g., the correct audio encoding or correct video encoding, port and protocol as well as the bearer requirements, such has average and maximum bandwidth, etc). Once the offer/answer of the Session Description Parameters are agreed upon, the media path is set up for the session. The media path will traverse any Application Servers or Media Resource Functions bypassing the IMS Core 60. Session signaling, such as floor control events, signaling, and link sender/receiver reports will traverse the IMS Core 60.

The PDD 10 can obtain diagnostic data by inspecting the sender/receiver reports to determine the number of sent and dropped packets, jitter, and roundtrip delay. Information regarding the bearer characteristics (e.g., bandwidth required, acceptable jitter, bit error rates, protocol, port, etc.) may be retrieved from the Session Description Parameters found in the SIP INVITE message body.

It should be noted that the invention has been described with reference to a few exemplary and preferred embodiments in order to demonstrate the principles and concepts of the invention. The invention is not limited to the embodiments described herein. As will be understood by those skilled in the art, modifications may be made to the embodiments described herein and all such modifications are within the scope of the invention.

What is claimed is:

1. A method comprising:
   receiving, at a device from a user of the device, a request associated with an internet protocol address of an element of a packet-based wireless network, the device comprising a processor, a transceiver, an antenna, and a display;
   performing, by the device, a trace route routine to collect internet protocol addresses of elements along a first route to the element of the packet-based wireless network;
   communicating, by the device via the transceiver and the antenna, the request to a mobile communications network in communication with the packet-based wireless network;
   collecting, by the device, the internet protocol addresses of the elements along the first route to the element of the packet-based wireless network;
   obtaining, by the device, information relating to a type of data security employed by the packet-based wireless network;
   causing, by the device, the internet protocol addresses of the elements along the first route to the element of the packet-based wireless network and the information relating to the type of data security employed by the packet-based wireless network to be displayed via the display;
   receiving a session initiation protocol command;
   sending the session initiation protocol command to an internet protocol multi-media subsystem network;
   receiving a response to the session initiation protocol command, the response comprising a session initiation protocol header; and
   examining the session initiation protocol header to determine a second route associated with the response.

2. The method of claim 1, further comprising capturing a timestamp associated with the session initiation protocol header to measure latency within the internet protocol multi-media subsystem network.

3. The method of claim 1, further comprising:
   examining a body content of the response and session definition protocol content; and
   causing information corresponding to the body content of the response and the session definition protocol content to be displayed via the display.

4. A device comprising:
   a processor;
   a transceiver;
   an antenna;
   a display; and
   a memory storing instructions that, when executed by the processor, cause the processor to perform operations comprising
      receiving, from a user of the device, a request associated with an internet protocol address of an element of a packet-based wireless network,
      performing a trace route routine to collect internet protocol addresses of elements along a first route to the element of the packet-based wireless network,
      communicating, via the transceiver and the antenna, the request to a mobile communications network in communication with the packet-based wireless network,
      collecting the internet protocol addresses of the elements along the first route to the element of the packet-based wireless network,
      obtaining information relating to a type of data security employed by the packet-based wireless network,
      causing the internet protocol addresses of the elements along the first route to the element of the packet-based wireless network and the information relating to the type of data security employed by the packet-based wireless network to be displayed via the display,
      receiving a session initiation protocol command,
      sending the session initiation protocol command to an internet protocol multi-media subsystem network,
      receiving a response to the session initiation protocol command, the response comprising a session initiation protocol header, and
      examining the session initiation protocol header to determine a second route associated with the response.

5. The device of claim 4, wherein the display is a high-resolution color display screen.

6. The device of claim 5, wherein the high-resolution color display screen displays an entire page of diagnostic information.

7. The device of claim 4, wherein the packet-based wireless network is a general packet radio service network.

8. The device of claim 4, wherein the packet-based wireless network is a wireless application protocol network.

9. The device of claim 4, wherein the processor is one of a microprocessor, a microcontroller, an application specific integrated circuit, a digital signal processor, and a printed circuit board.

10. The device of claim 4, wherein the operations further comprise capturing a timestamp associated with the session initiation protocol header to measure latency within the internet protocol multi-media subsystem network.

11. The device of claim 4, wherein the operations further comprise:
  examining a body content of the response and session definition protocol content; and
  causing information corresponding to the body content of the response and the session definition protocol content to be displayed via the display.

* * * * *